(12) United States Patent
Pirinen

(10) Patent No.: US 11,290,625 B1
(45) Date of Patent: Mar. 29, 2022

(54) IMAGING ASSEMBLY AND CAMERA WITH FILTERING DEVICES WITH DIFFERENT LIGHT TRANSMITTANCE

(71) Applicant: Changzhou Raytech Optronics Co., Ltd., Changzhou (CN)

(72) Inventor: Ossi Pirinen, Tampere (FI)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 0 days.

(21) Appl. No.: 17/128,220

(22) Filed: Dec. 21, 2020

(51) Int. Cl.
*H04N 5/225* (2006.01)

(52) U.S. Cl.
CPC ....... *H04N 5/2253* (2013.01); *H04N 5/22521* (2018.08)

(58) Field of Classification Search
CPC .......................... H04N 5/2253; H04N 5/22521
See application file for complete search history.

(56) References Cited

U.S. PATENT DOCUMENTS

| | | | |
|---|---|---|---|
| 2012/0194728 A1* | 8/2012 | Kim | G02B 26/007 348/342 |
| 2015/0156427 A1* | 6/2015 | Wagner | H04N 5/238 348/148 |
| 2019/0229137 A1* | 7/2019 | Kubo | H04N 5/23229 |
| 2020/0280662 A1* | 9/2020 | Gao | H04M 1/0264 |

\* cited by examiner

*Primary Examiner* — Padma Haliyur
(74) *Attorney, Agent, or Firm* — W&G Law Group

(57) ABSTRACT

Provided are an imaging assembly and a camera including the imaging assembly. The imaging assembly comprises: an installing support; filtering devices installed to the installing support and movable relative to the installing support, the filtering devices comprising a first filtering device and a second filtering device; and an image sensor installed to the installing support and configured to receive a light signal filtered by the filtering devices. The first filtering device and the second filtering device each is capable of moving to a respective preset position for filtering incoming light; and light transmittance of the first filtering device is smaller than light transmittance of the second filtering device. With such design, the filtering devices having different light transmittances can be used respectively in a bright environment and in a dark environment, thereby increasing imaging quality in a dark environment, and thus being more in line with actual usage requirements.

8 Claims, 3 Drawing Sheets

IMAGING ASSEMBLY AND CAMERA WITH FILTERING DEVICES WITH DIFFERENT LIGHT TRANSMITTANCE

TECHNICAL FIELD

The present invention relates to the technical field of video devices, and in particular, to an imaging assembly and a camera.

BACKGROUND

A long focal length camera is usually provided with an infra-red cut filter (IRCF). Due to a filtering effect of the IRCF, most of incoming light cannot pass through the IRCF. When the long focal length camera is used in a dark environment, only a small amount of the light can pass through the IRCF, thereby resulting in a poor imaging quality.

SUMMARY

An embodiment of the present invention provides an imaging assembly and a camera, aiming to solve the problem of a poor quality of an image captured by the camera in a dark environment in the prior art.

An embodiment of the present invention provides an imaging assembly, including: an installing support; filtering devices installed to the installing support and movable relative to the installing support, the filtering devices comprising a first filtering device and a second filtering device; an image sensor installed to the installing support and configured to receive a light signal filtered by the filtering devices; and a driving device configured to drive the first filtering device and the second filtering device to move relative to the installing support. Each of the first filtering device and the second filtering device is capable of moving to a respective preset position for filtering incoming light; and a light transmittance of the first filtering device is smaller than a light transmittance of the second filtering device.

As an improvement, the first filtering device and the second filtering device are located at two opposite sides of the installing support along a thickness direction of the imaging assembly.

As an improvement along a length direction of the imaging assembly, an end of the first filtering device close to the image sensor is connected to the installing support, and an end of the second filtering device close to the image sensor is connected to the installing support; and each of the first filtering device and the second filtering device can be rotated into a preset position.

As an improvement, each of the first filtering device and the second filtering device is installed to the installing support through a respective hinge.

As an improvement, the installing support is provided with a guide rail, and each of the first filtering device and the second filtering device is capable of moving along the guide rail to the respective preset position.

As an improvement, the imaging assembly further includes a dustproof component.

As an improvement, the dustproof component is installed between the image sensor and the filtering devices.

As an improvement, the imaging assembly further includes a lens barrel installed to the installing support, and the dustproof component is installed between the filtering devices and the lens barrel.

As an improvement, the dustproof component is a transparent structure.

An embodiment of the present invention further provides a camera, including an imaging assembly. The imaging assembly includes: an installing support; filtering devices installed to the installing support and movable relative to the installing support, the filtering devices comprising a first filtering device and a second filtering device; and an image sensor installed to the installing support and configured to receive a light signal filtered by the filtering devices. Each of the first filtering device and the second filtering device is capable of moving to a respective preset position for filtering incoming light; and a light transmittance of the first filtering device is smaller than a light transmittance of the second filtering device.

The present invention provides an imaging assembly and a camera. The imaging assembly includes an installing support, an image sensor, and filtering devices. The filtering devices includes a first filtering device and a second filtering device. The light transmittance of the first filtering device is smaller than the light transmittance of the second filtering device, and each of the first filtering device and the second filtering device is capable of moving to the respective preset position for filtering the incoming light. With such a design, the filtering devices having different light transmittances can be used respectively in a bright environment and in a dark environment, thereby increasing the imaging quality in a dark environment, and thus being more in line with actual usage requirements.

It should be understood that the foregoing general description and the following detailed description are merely exemplary and are not intended to limit the present invention.

REFERENCE NUMERALS

Figure 1:
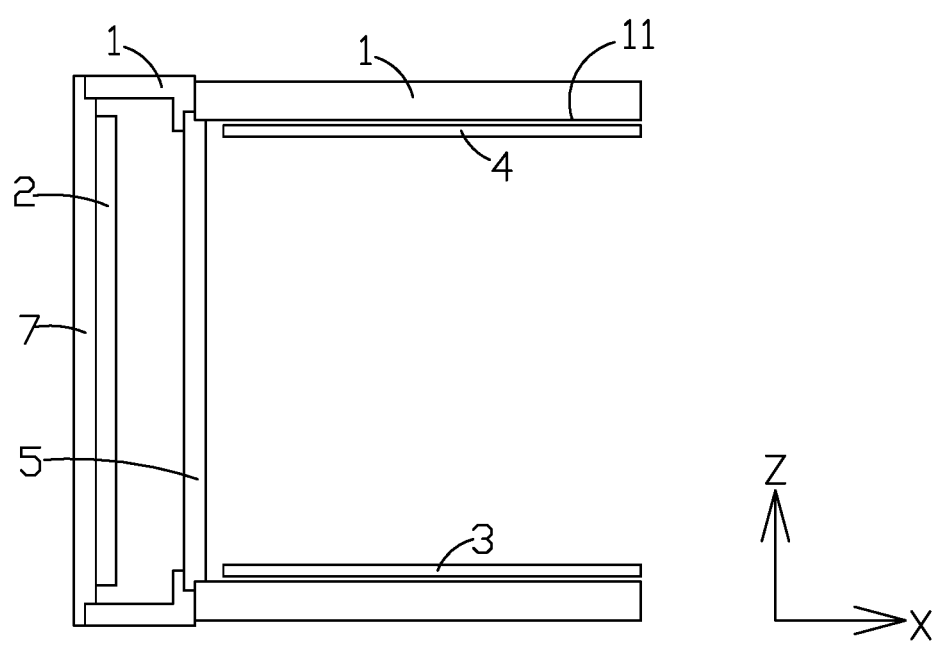
FIG. 1 is a schematic structural diagram of an imaging assembly according to an embodiment of the present invention.

1—installing support;
2—image sensor;
3—first filtering device;
4—second filtering device;
5—dustproof component;
6—lens barrel;
7—circuit board.

The drawings herein are incorporated into and constitute a part of the present specification, illustrate embodiments of the present invention and explain principles of the present invention together with the specification.

DESCRIPTION OF EMBODIMENTS

For better illustrating technical solutions of the present invention, embodiments of the present invention will be described in detail as follows with reference to the accompanying drawings.

It should be noted that, the described embodiments are merely exemplary embodiments of the present invention, which shall not be interpreted as providing limitations to the present invention. All other embodiments obtained by those skilled in the art without creative efforts according to the embodiments of the present invention are within the scope of the present invention.

The terms used in the embodiments of the present invention are merely for the purpose of describing particular embodiments but not intended to limit the present invention. Unless otherwise noted in the context, the singular form expressions "a", "an", "the" and "said" used in the embodiments and appended claims of the present invention are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present invention. In addition, when an element is described as being "above" or "under" another element in the context, it should be understood that the element may be directly or via an intermediate element located "above" or "under" another element.

A long focal length camera is usually provided with an infra-red cut filter (IRCF). The incoming light needs to pass through the IRCF to reach the image sensor. However, since most of the incoming light cannot pass through the IRCF, only a small amount of the incoming light can reach the image sensor. When the long focal length camera is used in a bright environment, the captured image will have a good quality due to the sufficient incoming light. However, when the long focal length camera is used in a dark environment, the captured images will have a poor quality due to the insufficient incoming light.

In view of this, an embodiment of the present invention provides an imaging assembly and a camera, aiming to increase the quality of the image captured by the camera in a dark environment.

As shown in FIG. 1, an embodiment of the present invention provides an imaging assembly. The imaging assembly includes an installing support 1, filtering devices and an image sensor 2. The filtering devices may be filters. The filtering devices and the image sensor 2 are installed to the installing support 1, and the image sensor 2 is electrically connected to the circuit board 7. For example, the image sensor 2 can be installed to the installing support 1 through the circuit board 7. After incoming light is filtered by the filtering devices, it reaches the image sensor 2, and the image sensor 2 is configured to receive a light signal.

The filtering devices includes a first filtering device 3 and a second filtering device 4, and a driving device can drive each of the first filtering device 3 and the second filtering device 4 to move into a respective preset position for filtering the incoming light. The incoming light needs to be filtered by the first filtering device 3 or by the second filtering device 4 before reaching the image sensor 2.

For example, a light transmittance of the first filtering device 3 is smaller than a light transmittance of the second filtering device 4.

When the imaging assembly is used in a bright environment, because the incident light is sufficient, it can drive the first filtering device 3 to move to a preset position for filtering the incident light; when the imaging assembly is used in a dark environment, the incident light is insufficient, it may drive the second filtering device 4 to move to a preset position for filtering incident light. Since the light transmittance of the second filtering device 4 is larger than the light transmittance of the first filtering device 3, more light can pass through the second filtering device 4 in a weak light environment, thereby improving the imaging quality.

The filtering device has a function of filtering out light having a certain color, so that when imaging, an object having this color can be more prominent. However, while imaging in a dark environment, compared to making the object prominent, it is more important that the image sensor 2 receives a stronger light signal. By allowing more of incoming light to pass through the filtering device, an intensity of the light signal can be increased, which in turn can increase an imaging quality in a dark environment, which is more in line with actual usage requirements.

As shown in FIG. 1, the installing support 1 has an inner wall 11, in a possible implementation manner, the first filtering device 3 and the second filtering device 4 are respectively located at two opposite sides of the installing support 1 along a thickness direction Z of the imaging assembly and connected to the inner wall 11, each filtering device has a length direction perpendicular to the thickness direction Z of the imaging assembly.

In this way, a possibility of interference between a position of the first filtering device 3 and a position of the second filtering device 4 can be reduced. By arranging the first filtering device 3 and the second filtering device 4 at two opposite sides of the installing support 1, there is a certain distance between the first filtering device 3 and the second filtering device 4, thereby facilitating movement of each of the first filtering device 3 and the second filtering device 4 to a preset position. Besides, in this way, it can reduce a possibility of interference with the other one filtering device when one filtering device moves.

Figure 2:
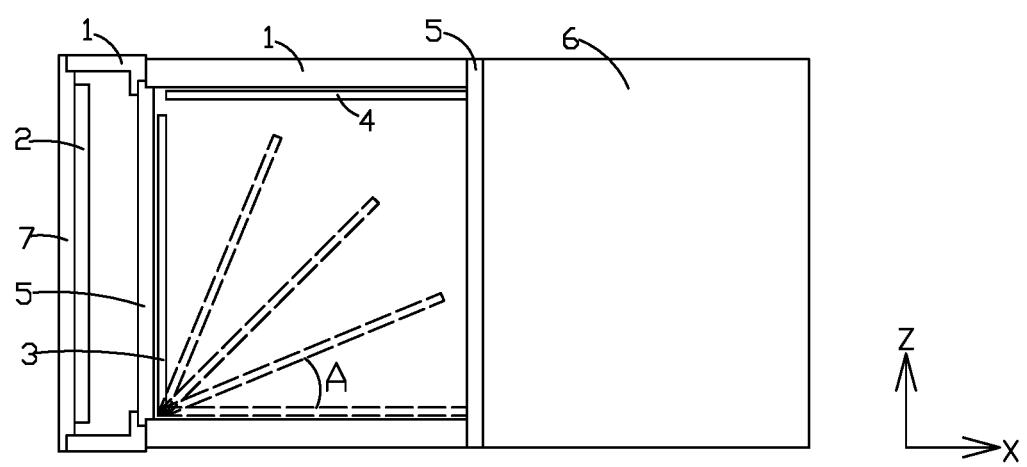
FIG. 2 is a schematic structural diagram of an imaging assembly according to another embodiment of the present invention.

In a possible implementation manner, along a length direction X of the imaging assembly, an end of the first filtering device 3 close to the image sensor 2 is connected to the installing support 1, and another end of the second filtering device 4 close to the image sensor 2 is connected to the installing support 1. Each of the first filtering device 3 and the second filtering device 4 can rotate relative to the installing support 1 so as to reach a respective preset position. As shown in FIG. 2, taking the first filtering device 3 as an example, FIG. 2 illustrates a schematic diagram of a movement process of the first filtering device 3.

When the camera is used in a bright environment, a filter is usually used for filtering the incoming light. For example, when the captured object has a yellow color, in order to make the object more prominent and make the contrast to the surrounding environment more obvious, the filter is usually used for filtering the incoming light, so that more yellow light passes through the filter to reach the image sensor 2, and most other-colored light except the yellow light cannot pass through the filter. In this way, the object can be more prominent. While imaging in a bright environment, the filtering device having the lower light transmittance is usually used to increase the imaging quality and make the captured object more prominent. At this time, the first filtering device 3 is driven to rotate relative to the installing support 1, so that the first filtering device 3 can move to a preset position, and the incoming light needs to pass through the first filtering device 3 before reaching the image sensor 2. When the camera is used in a dark environment, in order to increase the intensity of the light signal received by the image sensor 2, more light needs to pass through the filtering device. At this time, the first filtering device 3 moves to the original position, and the second filtering device 4 is driven to move to the preset position, so that the second filtering device 4 can be used for filtering the incoming light. Since the light transmittance of the second filtering device 4 is larger than the light transmittance of the first filtering device 3, the intensity of the light signal can be increased, thereby increasing the quality of the image captured by the camera in a dark environment.

An end of the first filtering device 3 close to the image sensor 2 is connected to the installing support 1, so that the first filtering device 3 rotates about this side and form an acute angle A with the inner wall 11 during the rotation process. Such a design has advantages of a simple structure and easy processing.

For example, in a possible implementation manner, the first filtering device 3 and the second filtering device 4 are respectively installed to the installing support 1 through hinges.

The hinge has the advantages of a simple structure and a low cost, and has functions of buffering and reducing a possibility of damage to the filtering device.

In a possible implementation manner, the installing support 1 is provided with a guide rail, and the first filtering device 3 and the second filtering device 4 can respectively move along the guide rail to a preset position.

With such a design, stability of movement of the filtering device can be improved. The first filtering device 3 and the second filtering device 4 move along the respective preset guide rails, thereby reducing a possibility of interference between the two.

Figure 3:
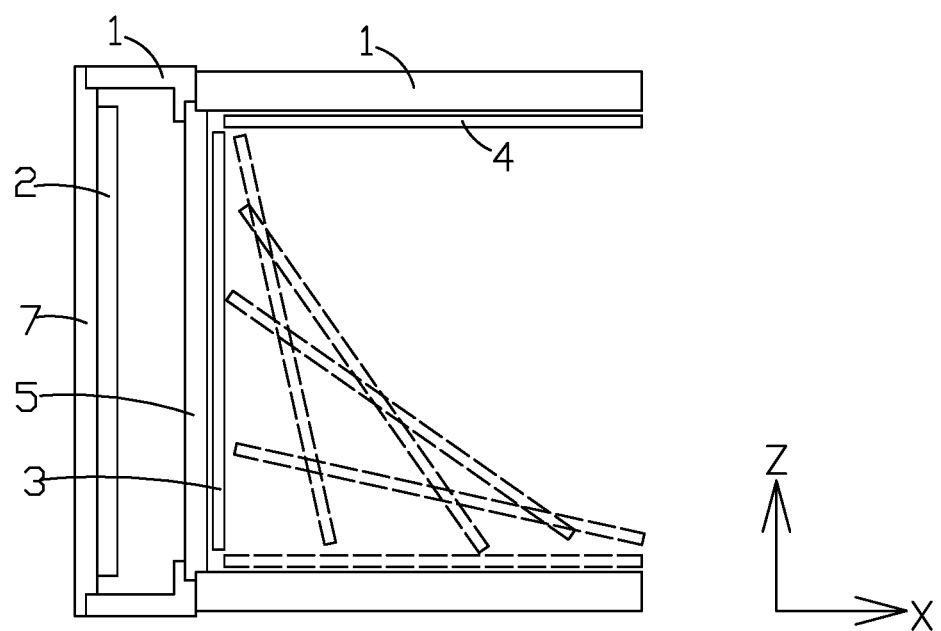
FIG. 3 is a schematic structural diagram of an imaging assembly according to still another embodiment of the present invention.

Taking the first filtering device 3 as an example, as shown in FIG. 3, which illustrates a movement path of the first filtering device 3 along the guide rail (not shown in the figure), and the first filtering device 3 moves from a horizontal direction to a direction parallel to the image sensor 2.

It should be noted here that the directions described above are illustrated from a perspective of the figure.

As shown in FIG. 1, in a possible implementation manner, the imaging assembly further includes a dustproof component 5.

With the dustproof component 5, it is easy to keep the imaging assembly clean and reduce a possibility of dust and other impurities entering the imaging assembly. When dust and other impurities enter the imaging assembly, it is easy to cause a phenomenon of light refraction and the like, thereby causing the incoming light to deviate from the preset path, and thus affecting the imaging quality.

As shown in FIG. 2, in a possible implementation manner, the dustproof component 5 is arranged between the image sensor 2 and the filtering device.

In this way, the image sensor 2 can be protected, thereby reducing an influence of dust and other impurities on the image sensor 2.

As shown in FIG. 2, in a possible implementation manner, the imaging assembly further includes a lens barrel 6, which is installed to the installing support 1, and the dustproof component 5 is located between the filtering device and the lens barrel 6.

With such a design, a dustproof device can protect the filtering device, thereby reducing an influence of dust and other impurities on the filtering device.

In a possible implementation manner, the dustproof component 5 is a transparent structure. For example, the dustproof component 5 may be made of glass.

Such a design can reduce an influence of the dustproof component 5 on the incoming light, thereby reducing the influence on the imaging quality.

The dustproof component 5 can protect only the image sensor 2 or the filtering device, or a plurality of dustproof components 5 can be provided to protect both the image sensor 2 and the filtering device. A specific setting manner thereof can be selected according to the actual situation.

Based on the imaging assembly described in the above embodiments, an embodiment of the present invention further provides a camera. The camera may include the imaging assembly involved in any of the above embodiments. Since the imaging assembly has the technical effects described above, the camera including the imaging assembly will also have these technical effects, which will not be repeated herein.

The present invention provides an imaging assembly and a camera. The imaging assembly includes an installing support 1, an image sensor 2, and filtering devices. The filtering devices include a first filtering device 3 and a second filtering device 4. The light transmittance of the first filtering device 3 is smaller than the light transmittance of the second filtering device 4, and each of the first filtering device 3 and the second filtering device 4 can move to a respective preset position for filtering the incoming light. With such a design, the filtering devices having different light transmittances can be used respectively in a bright environment and in a dark environment, thereby increasing the imaging quality in a dark environment, and thus being more in line with actual usage requirements.

The above-described embodiments are merely preferred embodiments of the present invention and are not intended to limit the present invention. Various changes and modifications can be made to the present invention by those skilled in the art. Any modifications, equivalent substitutions and improvements made within the principle of the present invention shall fall into the protection scope of the present invention.

What is claimed is:

1. An imaging assembly, comprising:
   an installing support with an inner wall;
   filtering devices installed to the installing support and movable relative to the installing support, the filtering devices comprising a first filtering device and a second filtering device;
   an image sensor installed to the installing support and configured to receive a light signal filtered by the filtering devices; and
   a driving device configured to drive the first filtering device and the second filtering device to move relative to the installing support,
   wherein each of the first filtering device and the second filtering device is capable of moving to a respective preset position for filtering incoming light; and a light transmittance of the first filtering device is smaller than a light transmittance of the second filtering device, the first filtering device and the second filtering device are located at two opposite sides of the installing support along a thickness direction of the imaging assembly and connected to the inner wall, each filtering device has a length direction perpendicular to the thickness direction of the imaging assembly, along a length direction of the imaging assembly, an end of the first filtering device close to the image sensor is connected to the installing support, and an end of the second filtering device close to the image sensor is connected to the installing support, and each of the first filtering device and the second filtering device is capable of rotating into a preset position and an acute angle is formed between the filtering device and the inner wall during the rotation process.

2. The imaging assembly as described in claim 1, wherein each of the first filtering device and the second filtering device is installed to the installing support through a respective hinge.

3. The imaging assembly as described in claim 1, wherein the installing support is provided with a guide rail, and each of the first filtering device and the second filtering device is capable of moving along the guide rail to the respective preset position.

4. The imaging assembly as described in claim 1, further comprising a dustproof component.

5. The imaging assembly as described in claim 4, wherein the dustproof component is installed between the image sensor and the filtering devices.

6. The imaging assembly as described in claim 4, further comprising a lens barrel installed to the installing support, wherein the dustproof component is installed between the filtering devices and the lens barrel.

7. The imaging assembly as described in claim 4, wherein the dustproof component is a transparent structure.

8. A camera, comprising an imaging assembly, wherein the imaging assembly comprises:

an installing support with an inner wall;

filtering devices installed to the installing support and capable of moving relative to the installing support, the filtering devices comprising a first filtering device and a second filtering device; and an image sensor installed to the installing support and configured to receive a light signal filtered by the filtering devices, wherein each of the first filtering device and the second filtering device is capable of moving to a respective preset position for filtering incoming light; and a light transmittance of the first filtering device is smaller than a light transmittance of the second filtering device, the first filtering device and the second filtering device are located at two opposite sides of the installing support along a thickness direction of the imaging assembly and connected to the inner wall, each filtering device has a length direction perpendicular to the thickness direction of the imaging assembly, along a length direction of the imaging assembly, an end of the first filtering device close to the image sensor is connected to the installing support, and an end of the second filtering device close to the image sensor is connected to the installing support and each of the first filtering device and the second filtering device is capable of rotating into a preset position and an acute angle is formed between the filtering device and the inner wall during the rotation process.

\* \* \* \* \*